Nov. 1, 1932.  G. C. CAPPA  1,885,413
CHANGE SPEED GEAR FOR MOTOR CARS
Filed April 8, 1929  3 Sheets-Sheet 1

Inventor,
Giulio C. Cappa.
By Henry Ott Jr
Atty.

Nov. 1, 1932.                G. C. CAPPA                1,885,413
                   CHANGE SPEED GEAR FOR MOTOR CARS
                  Filed April 8, 1929        3 Sheets-Sheet 3

Inventor
Giulio C. Cappa.
By Henry Ort Jr.
             Atty.

Patented Nov. 1, 1932

1,885,413

UNITED STATES PATENT OFFICE

GIULIO CESARE CAPPA, OF TURIN, ITALY, ASSIGNOR TO SOCIETÁ ANONIMA AUTOMOBILI ANSALDO, OF TURIN, ITALY

CHANGE SPEED GEAR FOR MOTOR CARS

Application filed April 8, 1929, Serial No. 353,471, and in Italy April 14, 1928.

This invention relates to improvements in or relating to change speed gear for motor vehicles.

The present invention comprises a power transmission gear having in combination in one box a driving shaft, a counter-shaft situated in alignment with the former, a secondary shaft arranged above said counter-shaft and meshing with the driving shaft, pairs of fixed and sliding pinions mounted on said counter-shaft and secondary shaft, so as to obtain four speed variations, a driven shaft under the counter-shaft and a reducing gear between the secondary shaft and the driven shaft.

In the annexed drawings, Figs. 1-2 and 3a-3b-4 show two constructional forms of this arrangement.

Figure 5:
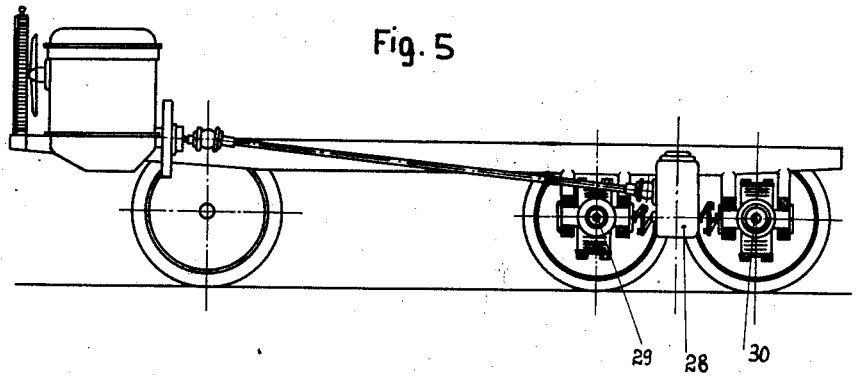
Figure 6A:
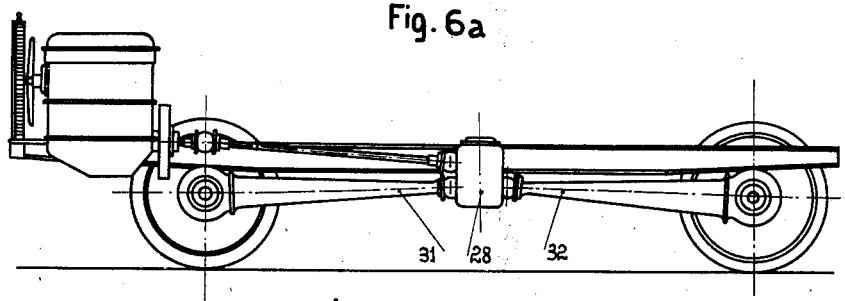
Figure 6B:
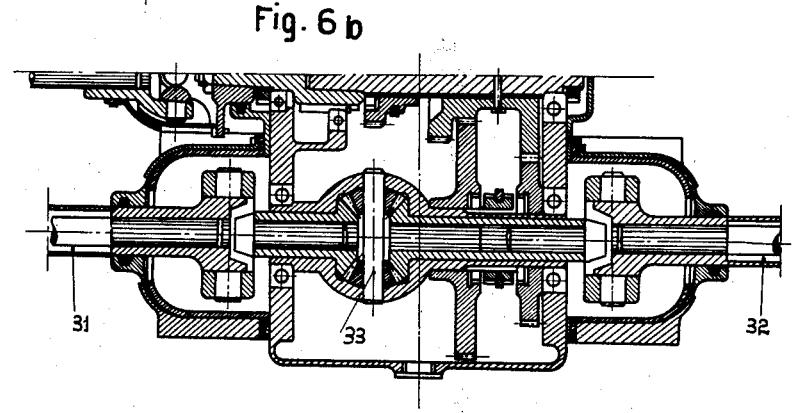

Fig. 5 shows the arrangement used in connection with a lorry having a multiple rear truck, and Figs. 6a-6b show the arrangement forming the object of this invention used in connection with a lorry having a single axle truck.

All the figures show a change speed gear of a particular suitable form which is not new but little known till now. However it is evident that any type of change speed gear and reducing gear may be used.

In the example shown, the drive is transmitted from the clutch shaft 1 through a suitable joint 2 to the driving shaft 3 of the change speed gear. A gear 4—5 in constant mesh transfers the drive to the secondary shaft 6 operating the countershaft 7 through gears 8—9, 10—11, 12—13, 14—15 corresponding to first, second, third and fourth speed respectively. The sliding pinions 10—12—16 and 9—15—17 instead of being mounted on the same shaft, as in the known arrangements, are arranged one on the shaft 6 and the other on the counter-shaft 7. It appears from the drawings that a very compact arrangement is thus obtained where all available space is rationally utilized.

The use of high-speed and consequently high efficiency engines on slow freight cars requires a great gearing down, which has been obtained until now by considerably increasing the ratio and therefore the size of the change speed gear, mounting a reducing gear in a block separated from the change speed box, providing the axles and sometimes the wheels themselves with driving gears of great size for gearing down, etc. All said inconveniences may be removed by the use of the arrangement shown in Figs. 1-2, in which a speed reducing mechanism 18 is arranged under the change speed gear and within the box itself. Said speed reducing mechanism is in constant mesh with the countershaft 7 through the gears 19—20 and is mounted on the shaft 21 from which the motion is transmitted to the vehicle driving shafts 22—23. The gear mechanism 18, according to the desired reduction of speed, may be constituted by the gearing 19—20 or a speed reducing gear set 18 contained in the space closed by the dotted line 18′.

The use of freight cars in changing road and load conditions implies the necessity of a wide speed range. This is generally obtained by increasing the number of speed ratios and consequently the size of the change speed gear, or by using disengageable reducing gears of great size associated with the speed box or driving axles. In the arrangement shown in Figs. 1-2 this purpose is attained in a much more suitable manner. It is sufficient to alter the gearing mechanism 18 in such a way that instead of remaining in constant gear with the countershaft 7 it may disengage therefrom and mesh with the countershaft itself by means either of the gear 19—20 or an additional gear 13—24.

In the first case the unit comprising the change speed gear and gearing down mechanism will give four ratios at low speed and high torque suitable for hard drives in difficult load or road conditions. In the second case the unit will give four ratios at low torque and high speed suitable for speedy drives in normal load and road conditions.

Figure 1:
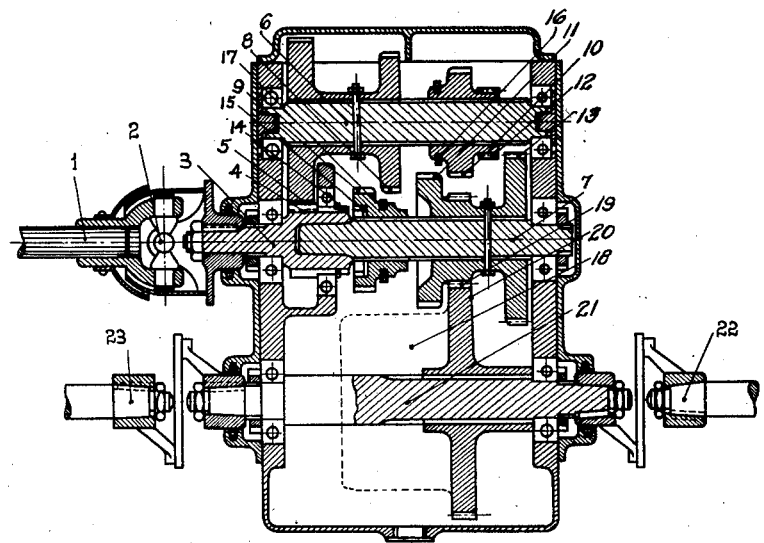
Figure 2:
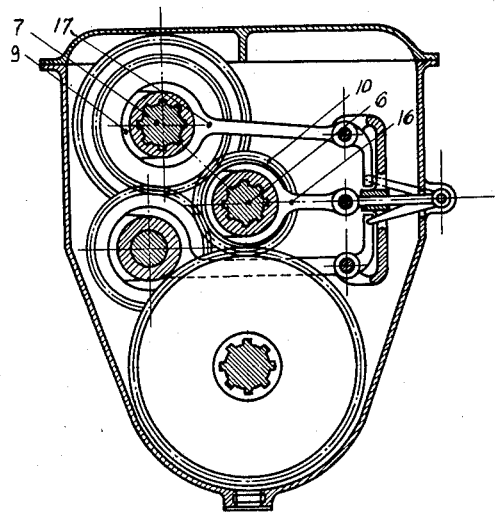
Figure 3A:
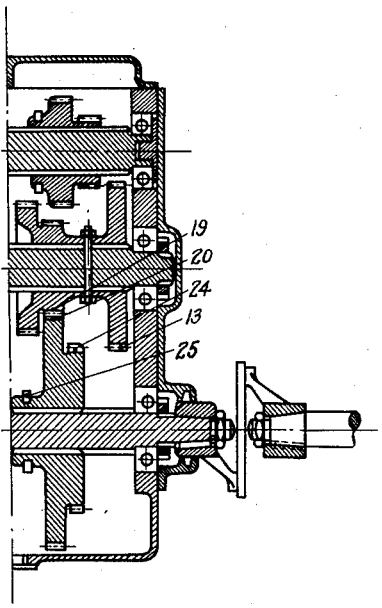
Figure 3B:
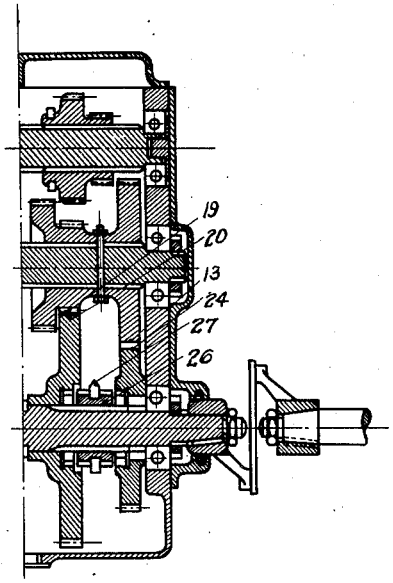
Figure 4:
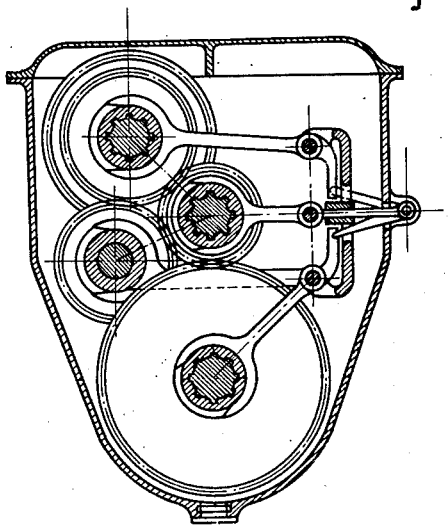

Figs. 3a-3b show by way of example two constructional forms of the novel arrangement obtained as above described.

According to the first constructional form, the gears 20—24 are slidably mounted together and operated by a fork 25. In the second constructional form the gears 20 and 24 are detached, loosely mounted on the shaft 21 and in permanent mesh with the corresponding gears 20 and 13; a sliding intermediate clutch member 26 driven by a fork 27 locking one gear or the other on the shaft 21.

The mounting of a change speed box on a motor car may be prevented by its excessive length, seldom by its width and practically never by its height. The addition of a gearing down mechanism stationary or slidable with or without accessory parts arranged under the change speed mechanism does not however alter the total space occupied. It is thus possible to use the invention in connection with arrangements that would otherwise be impossible or exceedingly complicated and of great size. Figs. 5-6 illustrate an example of said arrangements.

According to Fig. 5, the unit 28 is arranged between two axles 29 and 30 of the rear driving truck of a freight car. This arrangement would not be possible by the usual means. It would in fact be necessary to arrange a disconnectible gearing down mechanism on each side of the change speed gear box and provide a driving mechanism acting simultaneously on both reducing gears.

According to Fig. 6 the unit 28 is arranged on the center of two oscillating torque and thrust trucks operated through a differential 33 as shown in detail in Fig. 6a. In this case the space will not be limited to such an extent that would prevent the use of the usual means, but the final result would never give the advantages that are obtained by the arrangement shown and that will clearly appear from the drawings with reference to the above.

Finally it is obvious that the form and details of construction of the arrangement above described and shown in the annexed drawings are given by way of example and can be altered within wide limits without departing from the following claim.

What I claim is:

A driving gear comprising in combination a box, a driving shaft and a countershaft in said box in alignment with each other, a secondary shaft in said box, a gear fixed on said secondary shaft and having two toothed rims, a pinion on the driving shaft constantly meshing with one of said toothed rims, a slidable member on the countershaft for connecting this latter at will with the other toothed rim, a gear fixed on said countershaft having three toothed rims, a slidable member on the secondary shaft and having two toothed rims, one of which meshes with a rim of the gear on the countershaft in one end position of said slidable member and the other of which rims meshes with another toothed rim of the gear on the countershaft in the other end position of said slidable member, a driven shaft mounted in the box on the side remote from the secondary shaft and reducing gears for connecting said driven shaft to said countershaft, said reducing gears comprising the third toothed rim of the gear on the countershaft.

In testimony that I claim the foregoing as my invention, I have signed my name.

GIULIO CESARE CAPPA.